United States Patent [19]

Tanaka et al.

[11] 4,072,657

[45] Feb. 7, 1978

[54] RESIN COMPOSITE FOR PAINT CURABLE BY HIGH ENERGY IONIZING RADIATION

[75] Inventors: Tadashi Tanaka; Akira Okamoto, both of Yokohama; Takashi Kouno, Machida, all of Japan;

[73] Assignees: Nippon Steel Corporation, Tokyo, Japan;

[21] Appl. No.: 606,606

[22] Filed: Aug. 21, 1975

Related U.S. Application Data

[63] Continuation of Ser. No. 301,250, Oct. 26, 1972, abandoned.

[30] Foreign Application Priority Data

Oct. 26, 1971 Japan .................................. 46-85013

[51] Int. Cl.² ............................................. C08F 220/20;

[52] U.S. Cl. ............................ 260/47 UA; 204/159.22; 260/13; 260/17 R; 260/17 A; 260/17.4 R; 260/18 R; 260/23 R; 260/30 LR; 260/31.8 P; 260/23 AR; 260/33.8 R; 260/24; 260/33.8 UA; 260/27 R; 260/836; 260/28 P; 260/28.5 R; 260/837 R; 260/30.6 R; 260/859 R; 260/885; 260/901; 428/458; 428/463; 428/500;

[58] Field of Search ................... 526/320; 260/47 UA, 260/836, 837;

[56] References Cited

U.S. PATENT DOCUMENTS

| | | | |
|---|---|---|---|
| 2,928,804 | 3/1960 | Foster et al. ......................... | 526/320 |
| 3,373,221 | 3/1968 | May ..................................... | 260/836 |
| 3,720,592 | 3/1973 | Mani .................................... | 260/837 |
| 3,730,947 | 5/1973 | Stoffey et al. ................... | 260/47 UA |
| 3,754,054 | 8/1973 | Kimura et al. ...................... | 526/320 |
| 3,766,132 | 10/1973 | Lee et al. ......................... | 260/47 UA |

OTHER PUBLICATIONS

Hackh's Chemical Dictionary, McGraw-Hill (1972) p. 473 (4th edition).

*Primary Examiner*—Harry Wong, Jr.
*Attorney, Agent, or Firm*—Wenderoth, Lind & Ponack;

[57] ABSTRACT

Novel resin composite for paint to be used for painting the surfaces of steel plates and other plates therewith, which is non-volatile and sufficiently cured even in the air by high energy ionizing radiation, said resin composite being mainly composed of a prepolymer having $\alpha,\beta$ unsaturated double bonds at terminals and a molecular weight of more than 600 and a terminal double bond equivalent of more than 300, and a polyfunctional compound having more than two terminal $\alpha,\beta$ unsaturated double bonds, the compound ratio of both ingredients being 5 to 0.5 in terms of the terminal double bond equivalent ratio.

1 Claim, No Drawings

RESIN COMPOSITE FOR PAINT CURABLE BY HIGH ENERGY IONIZING RADIATION

This is a continuation application of Ser. No. 301,250, filed Oct. 26, 1972, now abandoned.

BACKGROUND OF THE INVENTION

The present invention is to provide a novel composite for paint curable in the air by high energy ionizing radiation (electron beams of energy as of several hundred KeV), whereby a paint film having excellent film properties can be obtained.

In recent years various studies on methods of curing paint films by high energy ionizing radiation have been carried out on a world-wide scale, and in some fields the results of the studies have been materialized even to an industrialization. In general, when considering characteristic effects to be obtained by applying the method of electron beam irradiation to a curing of paint films, there will be enumerated the following ones: (i) high speed curing, (ii) formation of paint film of high quality, (iii) no air pollution, (iv) low cost and (v) no heating operation. However, from patent specifications and articles published hitherto there could be found no resin composite, in which all of the above-mentioned items (i) to (v) could be simultaneously satisfied.

As for known resin composites curable by the irradiation of electron beams there may be mentioned, for instance, unsaturated polyester monomer type resins, epoxy monomer type resins and polyester oligomer monomer type resins and the like. Among them, the former two show considerably excellent film properties, but only in the film formability and film curability. Some of them have shown even the property of being cured in the air, which was, however, due to the existence of a volatile monomer contained in the resin composite. It is, however, to noted that in the case of using a volatile monomer as one component of the resin composite, the obtained film can not be freed from the disadvantage that the film properties will largely fluctuate on account of the volatilized amount of the monomer being different according to outside conditions. Moreover, the above-mentioned items, such as no air pollution and low cost, can not be satisfied. Further, in the case of using a polyester oligomer type monomer, it only shows a very good result in some specific properties, but is not satisfactory in the film properties, as seen synthetically.

Here some remarks will be added on the expressions "prepolymer" and "oligomer" used in this disclosure. The expression "prepolymer" designates a polymer having a molecular weight in the range of about 1000 to 10000, while the expression "oligomer" designates a polymer having a molecular weight of less than 1000.

SUMMARY OF THE INVENTION

The present invention is to overcome the unfavorable situations of resins cured by high energy ionizing radiation as above-mentioned. That is, the present invention is to provide a novel resin composite which is clearly distinguished from any conventional resins by the fact that the resin composite of the present invention can be sufficiently cured in the air by the irradiation of electron beams even without using any volatile component in contrast with conventional resins composites and compounds which were cured only insufficiently in the air on account of the effect of oxygen preventing radical polymerization. Further, the resin composite of the present invention is characterized by the advantages that it can satisfy the items, such as curability in the air, no air pollution and low cost, because it contains no volatile component, and it is stable in its properties.

The resin composite of the present invention is composed of two main ingredients: that is, as for the primary ingredient there are enumerated, for instance, prepolymers which have $\alpha,\beta$ active unsaturated double bonds composed of acrylic acid, methacrylic acid or their derivatives at terminals and a molecular weight of more than 600 and a molecular weight per each of said double bonds (hereinafter, it will be called "terminal double bond equivalent") of more than 300, preferably more than 400, such as ester of epoxy resin, ester of polyamide resin and polyacrylic ester resin. Ester of epoxy resin designates more precisely ester of acrylic acid or methacrylic acid or their derivatives of epoxy resin containing ether bond, or derivatives of said esters. Further, epoxy resin may be of bis-phenol type or alkyl ether type.

As for the secondary ingredient there are enumerated non-volatile polyfunctional compounds having more than two active double bonds at terminals and a molecular weight of less than 1000 and a terminal double bond equivalent of less than 500, such as polyester oligomers. Polyester oligomer can be the following compounds, that is, an ester prepared by condensating acrylic acid, methacrylic acid and/or their derivatives, on the end of an ester of at leaast one polyhydric alcohol and at least one polybasic carboxylic acid or a compound prepared by further esterifying an ester of at least one polyhydric alcohol and at least one polybasic carboxylic acid with acrylic acid, methacrylic acid and/or their derivatives.

It is to be noted for reference that the expression "terminal active double bond" designates the double bond introduced into molecules by the bonding of ester of acrylic acid, methacrylic acid or their derivatives.

In order to achieve the object of the present invention with the resin composite having the components as above-mentioned it is requisite that the compound ratio of the primary ingredient and the secondary ingredient lies within a specified range. According to the experiments made by the inventors of the present invention the best compound ratio of both ingredients is about 1:1 in terms of the terminal double bond equivalent ratio. If the said ratio is below 0.5, a remarkable deterioration is caused in most of the film properties. On the contrary, if the ratio is raised in favor of the primary ingredient there is perceived a tendency of the paint film becoming brittle. This tendency is particularly remarkable, if the ratio exceeds 5. Therefore, in view of the practical use the terminal double bond equivalent ratio of the primary ingredient, to the secondary ingredient resides preferably in the range of 5 to 0.5.

The limitations in the molecular weights and the terminal double bond equivalents of both main ingredients and further in the compound ratio of both ingredients in terms of the terminal double bond equivalent ratio make indispensable characteristics of the present invention. If deviating from the above-mentioned limitations any one of the characteristic items as above-mentioned, that is, high speed curing, curing in the air, low cost, no air pollution and the like, will be lost.

The resin composite composed of the above-mentioned two main ingredients is a liquid at a room temperature. It is sufficiently paintable, as it is, or by being heated somewhat. In the case of insufficient paintability, it can be made into a solution by diluting the same with a cheap, innoxious solvent of low degree.

In molecules of the prepolymer belonging to epoxy resin derivatives used as the primary ingredient in the present invention there remain hydroxyl groups, which exert generally almost no unfavorable influences, but may be in some cases undesirable in the points of the boiling water-resisting property, exterior durability and chemicals-resisting property. In such a case epoxy resin derivatives are used by blocking the same by functional isocyanate, functional halogenide of organic acid, fatty oil or phenol according to the uses.

The resin composite of the present invention as above-mentioned designates that which is composed of main ingredients only. However, it may practically contain additives of various kinds as occasion demands, for instance, lacquer type natural or synthetic resins of various kinds, plasticizer or even modifier in some cases.

As to the irradiation of electron beams it is to noted that electron beams of relatively low energy as in the range of 100 to 1000 KeV are applied at a dosage of 0.5 to 10 Mrads (mega rads).

Here will be exemplified composites to be used as primary ingredients in the present invention.

No.

1. 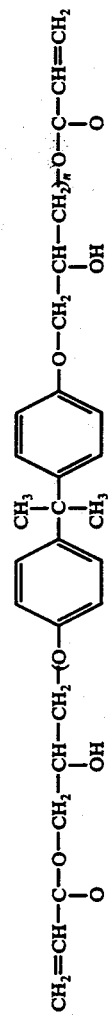

wherein n designates 2-6 of respective mixtures or singly.

2. 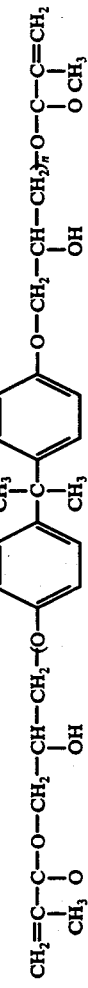

wherein n is the same as shown in the case of 1).

3. 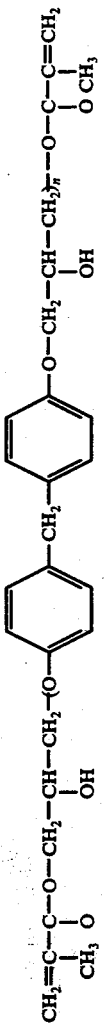

wherein n is 2 or more.

4. 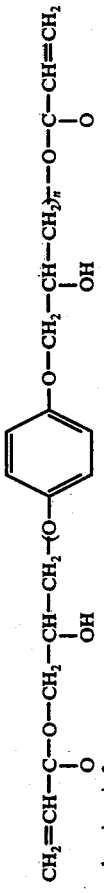

wherein n is 3 or more.

5. 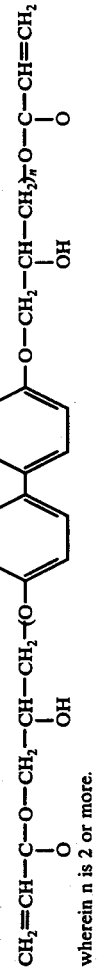

wherein n is 2 or more.

Then, secondary ingredients shall be exemplified in the following:
Polyester oligomers.

| No. | | Molecular weight | Terminal double bond equivalent |
|---|---|---|---|
| 1. | $CH_2=C(CH_3)-COO-(CH_2)_2-O-\overset{O}{\underset{\|}{C}}-\phenyl-\overset{O}{\underset{\|}{C}}-O-(CH_2)_2-C(CH_3)=CH_2$ | 390.4 | 195.2 |
| 2. | $CH_2=C(CH_3)-\overset{O}{\underset{\|}{C}}-O-(CH_2)_3-O-\overset{O}{\underset{\|}{C}}-\phenyl-\overset{O}{\underset{\|}{C}}-O-(CH_2)_3-C(CH_3)=CH_2$ | 418.5 | 209.2 |
| 3. | $[CH_2=C(CH_3)-\overset{O}{\underset{\|}{C}}-O-(CH_2)_2-CH-O-\overset{O}{\underset{\|}{C}}-\phenyl-\overset{O}{\underset{\|}{C}}-O-CH[CH_2-O-\overset{O}{\underset{\|}{C}}-C(CH_3)=CH_2]_2$ | 586.6 | 146.7 |

| # | Structure | | |
|---|---|---|---|
| 4. | [CH$_2$=C(CH$_3$)—COO—CH$_2$]$_3$—C—CH$_2$—O—C(=O)—C$_6$H$_4$—C(=O)—O—CH$_2$—C[CH$_2$—O—C(=O)—C(CH$_3$)=CH$_2$]$_3$ | 810.9 | 135.2 |
| 5. | CH$_2$=CH—C(=O)—O—(CH$_2$)$_2$—O—C(=O)—C$_6$H$_4$—C(=O)—O—(CH$_2$)$_2$—O—C(=O)—CH=CH$_2$ | 362.4 | 181.2 |
| 6. | (CH$_2$=CH—C(=O)—O—CH$_2$)$_3$—C—CH$_2$—O—C(=O)—C$_6$H$_4$—C(=O)—O—CH$_2$—C(CH$_2$—O—C(=O)—CH=CH$_2$)$_3$ | 726.7 | 121.1 |
| 7. | CH$_2$=CH—C(=O)—O—(CH$_2$)$_2$—O—C(=O)—(CH$_2$)$_4$—C(=O)—O—(CH$_2$)$_2$—O—C(=O)—CH=CH$_2$ | 450.6 | 225.3 |
| 8. | CH$_2$=C(CH$_3$)—C(=O)—O—(CH$_2$—CH$_2$—O)$_2$—C(=O)—C$_6$H$_4$—C(=O)—O—(CH$_2$—CH$_2$—O)$_2$—C(=O)—C(CH$_3$)=CH$_2$ | 428.5 | 214.2 |
| 9. | CH$_2$=C(CH$_3$)—C(=O)—O[(CH$_2$—CH$_2$—O)$_2$—C(=O)—C$_6$H$_4$—C(=O)—O]$_3$(CH$_2$—CH$_2$—O)$_2$—C(=O)—C(CH$_3$)=CH$_2$ | 951.1 | 475.6 |
| 10. | [CH$_2$=C(CH$_3$)—C(=O)—O—(CH$_2$—CH$_2$—O)$_2$—C]$_4$C$_4$H$_2$ | 879.0 | 219.7 |
| 11. | CH$_2$=C(CH$_3$)—C(=O)—O—(CH$_2$)$_2$—O—C(=O)—C$_6$H$_4$—C(=O)—O—(CH$_2$)$_2$—O—C(=O)—C(CH$_3$)=CH$_2$ | 478.5 | 239.3 |
| 12. | CH$_2$=C(CH$_3$)—C(=O)—O—(CH$_2$—CH$_2$—O)$_4$—C(=O)—C$_6$H$_4$—C(=O)—O—(CH$_2$—CH$_2$—O)$_4$—C(=O)—C(CH$_3$)=CH$_2$ | 654.8 | 327.4 |
| 13. | CH$_2$=C(CH$_3$)—C(=O)—O—CH$_2$—C(CH$_3$)$_2$—CH$_2$—O—C(=O)—C$_6$H$_4$—C(=O)—O—CH$_2$—C(CH$_3$)$_2$—CH$_2$—O—C(=O)—C(CH$_3$)=CH$_2$ | 474.6 | 237.3 |
| 14. | CH$_2$=CH—C(=O)—O—(CH$_2$—CH$_2$—O)$_2$—C(=O)—C$_6$H$_4$—C(=O)—O—(CH$_2$—CH$_2$—O)$_2$—C(=O)—CH=CH$_2$ | 450.5 | 225.2 |
| 15. | CH$_2$=CH—C(=O)—O—(CH$_2$—CH$_2$—O)$_3$—C(=O)—C$_6$H$_4$—C(=O)—O—(CH$_2$—CH$_2$—O)$_3$—C(=O)—CH=CH$_2$ | 538.6 | 269.3 |

-continued

| | | | |
|---|---|---|---|
| 16. | (CH$_2$=CH—C—O—CH$_2$)$_2$=C(C$_2$H$_5$)—O—C(C$_2$H$_5$)=(CH$_2$—O—C—CH=CH$_2$)$_2$<br>‖ ‖<br>O O | 614.7 | 153.7 |
| 17. | CH$_2$=C(CH$_3$)—C—O—(CH$_2$—CH$_2$—O)$_2$—C—[cyclohexane]—C—O—(CH$_2$—CH$_2$—O)$_2$—C(CH$_3$)=CH$_2$<br>‖ ‖ ‖ ‖<br>O O O O | 482.6 | 241.3 |
| 18. | CH$_2$=C(CH$_3$)—C—O—(CH$_2$—CH$_2$—O)$_2$—C—[cyclohexane]—C—O—(CH$_2$—CH$_2$—O)$_2$—C—C(CH$_3$)=CH$_2$<br>‖ ‖ ‖ ‖<br>O O O O | 484.6 | 242.3 |
| 19. | CH$_2$=C(CH$_3$)—C—O—(CH$_2$—CH$_2$—O)$_2$—C—(CH$_2$)$_4$—C—O—(CH$_2$—CH$_2$—O)$_2$—C—C(CH$_3$)=CH$_2$<br>‖ ‖ ‖ ‖<br>O O O O | 458.6 | 229.3 |
| 20. | CH$_2$=C(CH$_3$)—C—O—(CH$_2$—CH$_2$—O)$_2$—C—(CH$_2$)$_8$—C—O—(CH$_2$—CH$_2$—O)$_2$—C—C(CH$_3$)=CH$_2$<br>‖ ‖ ‖ ‖<br>O O O O | 514.7 | 257.3 |
| 21. | CH$_2$=C(CH$_3$)—C—O—(CH$_2$—CH$_2$—O)$_2$—C—CH$_2$—CH$_2$—C—O—(CH$_2$—CH$_2$—O)$_2$—C—C(CH$_3$)=CH$_2$<br>‖ ‖ ‖ ‖<br>O O O O | 542.7 | 271.4 |
| 22. | CH$_2$=C(CH$_3$)—C—O—(CH$_2$—CH$_2$—O)$_2$—C—CH$_2$—C—O—(CH$_2$—CH$_2$—O)$_2$—C—C(CH$_3$)=CH$_2$<br>‖ ‖ CH$_2$ ‖ ‖<br>O O O O | 442.5 | 221.3 |
| 23. | [CH$_2$=C(CH$_3$)—C—O—(CH$_2$—CH$_2$—O)$_2$—C]$_3$—C$_6$H$_3$<br>‖ ‖<br>O O | 678.8 | 226.3 |
| 24. | CH$_2$=CH—C—O—(CH$_2$—CH$_2$—O)$_2$—C—[cyclohexane]—C—O—(CH$_2$—CH$_2$—O)$_2$—C—CH=CH$_2$<br>‖ ‖ ‖ ‖<br>O O O O | 454.5 | 227.3 |
| 25. | CH$_2$=CH—C—O—(CH$_2$—CH$_2$—O)$_2$—C—O(CH$_2$—CH$_2$—O)$_2$—C—CH=CH$_2$<br>‖ ‖ CH—CH$_2$ CHO ‖<br>O O CH$_2$—CH$_2$ O | 468.6 | 234.3 |
| 26. | [CH$_2$=CH—C—O—(CH$_2$—CH$_2$—O)$_2$—C]$_4$—C$_6$H$_2$<br>‖ ‖<br>O O | 822.8 | 205.7 |

The paint of the present invention is accomplished, when practically used, by further adding coloring agents, extenders and various paint reforming agents and film reforming agents to the main ingredients of the present invention. As regards the coating method not only usual methods such as roll coater curtain coater, spray method but also a high speed coating method such as an airknife method may be applied.

Further, as for laquer type resins which are to be used in co-existence with the main ingredients of the present invention the following polymers may be exemplified. In some cases, however, it becomes necessary for the effective co-existences of said polymers to add some solvents or diluents, different from such a volatile monomer as may cause air pollution.

Natural laquer-type resins

For instance, asphalt, gilsonite, tar resins, resins, shellac, dammar, copal or their derivatives, cellulose resins (nitrated, butylized, acetilized), chlorinated rubber

Various oil-soluble resins

For instance, oil-soluble phenol resin, xylene resin, hydrocarbon resin, oil-modified alkyd resin, maleic polymer resin, polyamide resin, cumarone resin

Synthetic resins

For instance, acryl- or methacryl-ester polymer or their copolymers, vinyl acetate copolymer, vinyl chloride - vinyl acetate copolymer or their denatured resins, epoxy copolymer (Eponol), styrene copolymer, vinyl butyral resin

Plasticizers

For instance, diester phthalate, ester phosphate, paraffin chloride, naphthalene chloride, fatty oil, wax

Special esters

For instance, bis-2-hydroxy ethylmethacrylate acid phosphate

Other diens

For instance, divinyl pyridine

Urethane derivatives

For instance, allyl alcohol derivatives of hexamethylene diamine diisocyanate, hydroxy methylacrylate derivatives of toluene diamine diisocyanate

EXAMPLE 1

A paint resin composite was prepared by compounding diacrylate (molecular weight of about 1040) of bisphenol type epoxy resin (for instance, Epikote 1001)(molecular weight of about 900) having epoxy groups at both terminals as the primary ingredient with polyester oligomer Example No. 1 as the secondary ingredient at a terminal double bond equivalent ratio of 1:1. The thus obtained paint resin composite was applied to a 0.27 m/m thick galvanized iron or steel sheet previously subjected to a phosphate treatment (coating thickness of 20 u). Then, the painted sheet was irradiated with electron beams of 300 KeV at a dosage of 3 Mrads (mega rads), whereby there could be obtained a paint film which was sufficiently cured even in the air and had a pencil hardness H.

The obtained film showed favorable formability and adhesion properties: It showed fine records in the Erichsen test (7 m/m) as well as in 180 degree bending test with a test piece of threefold thickness, though somewhat unfavorable record in the Du Pont impact test (1 kg. 50 cm.). Further, in the salt spray test no change was perceived on the flat surface after the lapse of 500 hours even with a clear film.

EXAMPLE 2

A paint resin composite was prepared by compounding diacrylate (molecular weight of about 1550) of bisphenol type epoxy resin (for instance, Epikote 1004)(molecular weight of about 1400) having epoxy groups at both terminals as the primary ingredient and polyester oligomer Example No. 5 as the secondary ingredient at the terminal double bond equivalent ratio of 2:1. Then, a paint was prepared by adding 50 parts of titanium white to 100 parts of said paint resin composite.

This paint was also applied to a galvanized iron or steel sheet (coating thickness of 20 u), like in Example 1. Electron beams of 300 KeV were applied to the paint at a dosage of 5 Mrads in the air. The paint was sufficiently cured and a film having a pencil hardness H was obtained.

The painted sheet showed favorable formability and adhesion properties, as were demonstrated by fine records in the Erichsen test (8 m/m) and the 180 degree bending test with a test piece of threefold thickness. There were further obtained satisfactory results in the exterior durability test (an outdoor exposure for 6 months) and also in the salt water spray test (of 500 hours).

EXAMPLE 3

A paint resin composite was prepared by compounding dimethacrylate (molecular weight of about 1070) of the same epoxy resin as obtained in Example 1 as the primary ingredient with polyester oligomer composite Example No. 6 as the secondary ingredient at the terminal double bond equivalent ratio of 1:3. Then, a paint was prepared by adding 50 parts of titanium white to 100 parts of the said composite.

The paint was applied to the same galvanized iron or steel sheet as used in Example 1 (coating thickness of 15 u) and then subjected to the irradiation of electron beams of 300 KeV in the air at a dosage of 3 Mrads, whereby the paint was sufficiently hardened and a favorable film having a pencil hardness F could be obtained.

The painted sheet showed nearly the same properties as obtained in Example 1.

what is claimed is:

1. A non-volatile resin composite for paint curable in the air by high energy ionizing radiation which comprises:
   A. a prepolymer having a terminal active double bond at both terminals, the molecular weight per each of said double bonds being greater than 300, said prepolymer being of the formula

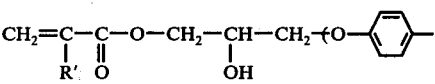

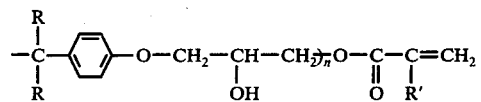

wherein n is an integer of from 2 to 6,
R' is H or —CH$_3$, and
R is —H or —CH$_3$, and
B. a non-volatile polyfunctional polyester oligomer having two or more terminal active double bonds at the terminals and a molecular weight of less than 1000, the molecular weight per each of said double bonds being less than 500, prepared by further esterifying the end of an ester of at least one unsaturated and/or saturated polybasic carboxylic acid with an acid selected from the group consisting of acrylic acid and methacrylic acid, and the terminal double bond equivalent ratio of A to B being in the range of 5 to 0.5.

* * * * *